(12) United States Patent
Rasmussen

(10) Patent No.: US 6,428,127 B1
(45) Date of Patent: Aug. 6, 2002

(54) CABINET FRAME

(76) Inventor: Knud Rasmussen, Villaveien 5, N-1820 Spydeberg (NO)

( * ) Notice: Subject to any disclaimer, the term of this patent is extended or adjusted under 35 U.S.C. 154(b) by 0 days.

(21) Appl. No.: 09/673,632
(22) PCT Filed: Apr. 27, 1999
(86) PCT No.: PCT/NO99/00138
§ 371 (c)(1),
(2), (4) Date: Dec. 20, 2000
(87) PCT Pub. No.: WO99/56511
PCT Pub. Date: Nov. 4, 1999

(30) Foreign Application Priority Data

Apr. 27, 1998 (NO) .............................................. 1892/98

(51) Int. Cl.$^7$ .............................................. A47G 29/00
(52) U.S. Cl. .................................... 312/265.4; 312/329
(58) Field of Search ............................ 312/265.1, 265.2, 312/265.3, 265.4, 296, 140, 326, 329; 403/231; 211/26, 26.2

(56) References Cited

U.S. PATENT DOCUMENTS

| | | | |
|---|---|---|---|
| 3,044,656 A | * 7/1962 | Combs et al. ............... | 312/140 |
| 4,643,319 A | 2/1987 | Debus et al. | |
| 5,020,866 A | * 6/1991 | McIlwraith ............... | 312/295.4 |
| 5,202,818 A | * 4/1993 | Betsch et al. ........ | 312/265.1 X |
| 5,228,762 A | 7/1993 | Mascrier | |
| 5,402,323 A | * 3/1995 | Schwenk et al. ............ | 361/816 |
| 5,806,946 A | * 9/1998 | Benner et al. ............ | 312/295.1 |
| 5,820,289 A | * 10/1998 | Kern et al. ................. | 403/231 |
| 6,062,664 A | * 5/2000 | Benner ..................... | 312/140 X |
| 6,179,398 B1 | * 1/2001 | Martin ..................... | 312/265.4 |
| 6,238,027 B1 | * 5/2001 | Kohler ..................... | 312/265.1 |
| 6,273,533 B1 | * 8/2001 | Nicolai et al. ........... | 312/265.1 |

FOREIGN PATENT DOCUMENTS

FR 2265302 * 10/1975 .............. 312/265.4

* cited by examiner

*Primary Examiner*—Janet M. Wilkens
(74) *Attorney, Agent, or Firm*—Bacon & Thomas, PLLC

(57) ABSTRACT

A cabinet having at least one door (5), in particular an electrical cabinet, comprising a framework made up of right angled metal profiles (1) which are mutually connected by use of corner members (2) having fastening elements (7) inserted in cavities in the profiles, whereby each profile is symmetrical about a plane in 45° relatively to two of the main directions of the cabinet and comprises two grooves (14) situated symmetrically about said plane, for sealing strips (12), said grooves (14) being directed outwardly from the interior of the cabinet, whereby the sealing strips (12) are in engagement with external wall panels, and whereby the bottom (11) of each groove (14) is situated inwardly of a respective profile wall (9) which delimits the profile towards the interior of the cabinet. The grooves (14) are situated along a respective free edge on the profile, whereby the profile is open from the external side, and the bottom (11) and/or the inner side wall (10) of each groove forms an abutment for fastening of hinge pans (3) at least in one of the profiles.

5 Claims, 5 Drawing Sheets

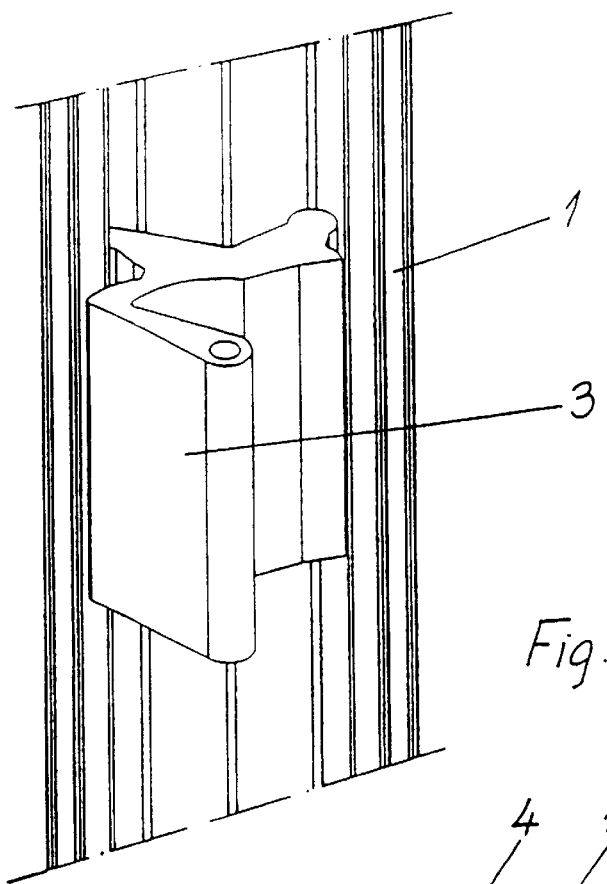
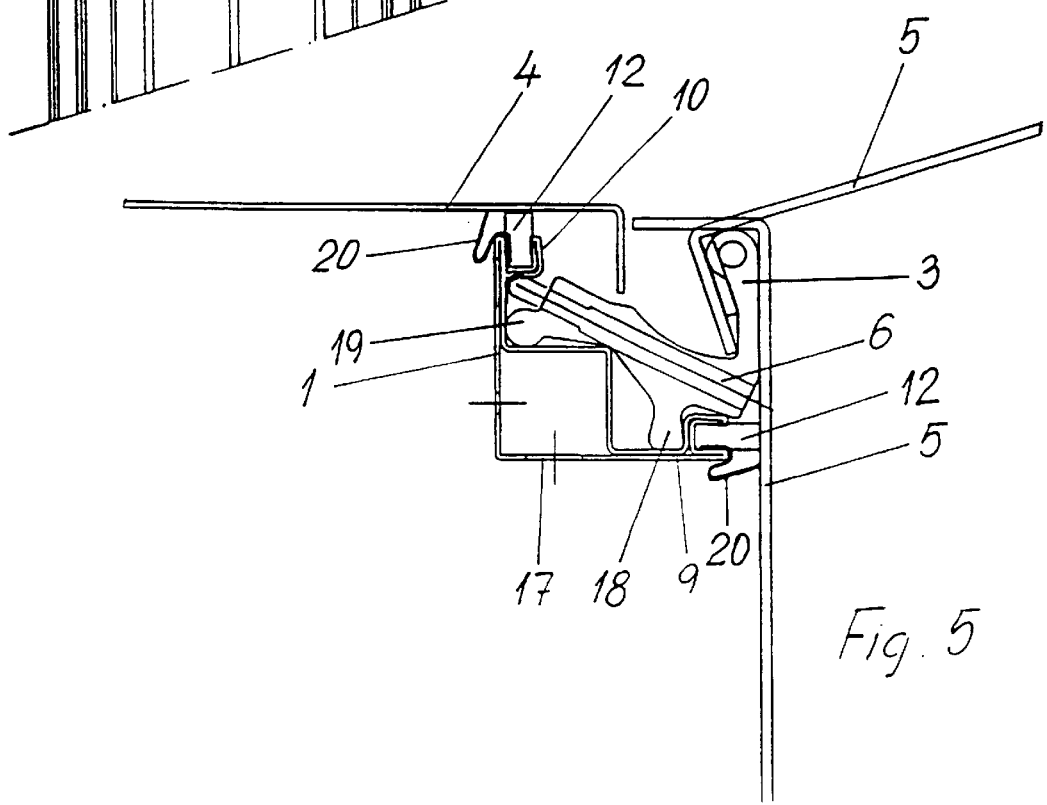

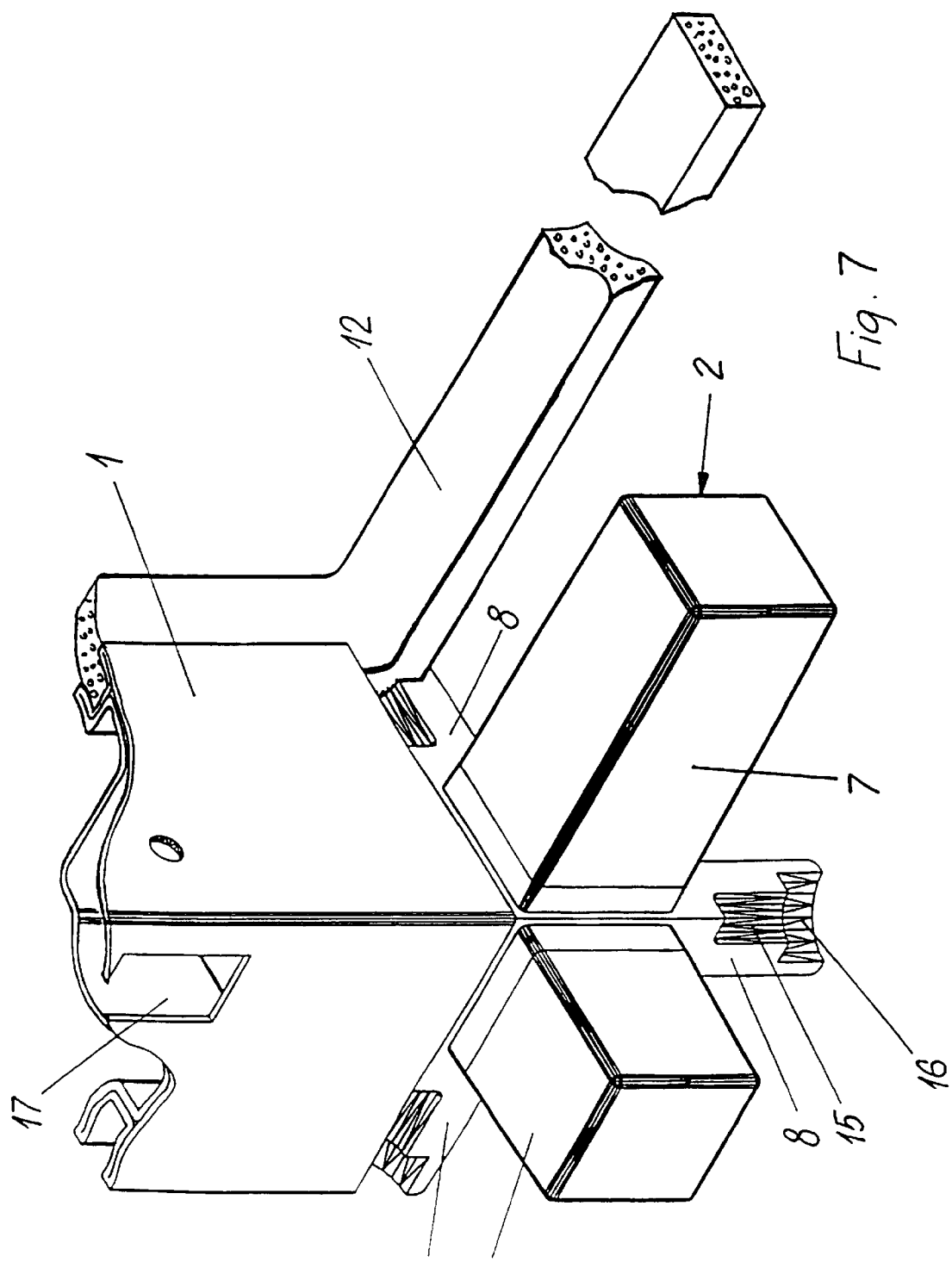

CABINET FRAME

This application is 371, of PCT/NO99/00138, Apr. 27, 1999.

BACKGROUND OF THE INVENTION

The present invention relates to a cabinet, and in particular an electrical cabinet, i.e. a cabinet adapted to contain electrical installations, in particular for use in places where there is a danger of seeping in of water into the cabinet, and in places where electrical or magnetical noise occurs. The cabinet is made up by a framework which form the edges of a parallelepiped, i.e. that the framework consists of twelve profiles, and the framework is closed by wall panels and at least one door.

In places where for instance water is flushed there is a need for watertight electrical cabinets, among else for preventing that the water causes short-circuiting and damages on electrical installations in the cabinet. There is also a need for sealing when components in the cabinet are to be protected against electrical or magnetical noise or when the surroundings are to be protected against such influence from components in the cabinet.

BACKGROUND ART

An example of such a cabinet is known from DE C1 3344598. The known cabinet comprises a framework formed by twelve metal profiles having the same sectional shape. Each profile comprises a cross-sectionally square portion, from which two flanges at right angle to each other protrude laterally, and on one of the flanges is a welt in right angle to the flange, whereby one side of the square together with the flange and the welt form a gutter. Moreover, the profiles have rectangular mounting holes in walls which face the interior of the cabinet. The profiles are assembled in such a manner that the corner of the square from which none of the flanges protrude is directed towards the interior of the cabinet. The publication does not show grooves for sealing strips. A planar sealing strip is shown between a wall and the external side of the welt of a profile, and a somewhat thicker sealing strip is shown between a hinged door and the edge of the flange which does not have any welt. This sealing strip is presupposed to be glued to the door. Moreover, the publication shows corner blocks which can be inserted in the cavities having a square cross section and to which adjoining profiles can be fastened by screws.

Additionally to connecting the profiles by means of the corner members they may be welded together where they are in mutual engagement two by two. The profiles are cut at right angles.

WO 96/14730 shows a cabinet formed by a framework, having flanges and welts which define longitudinal grooves for mounting of sealing strips, which may sealingly engage external wall panels and/or a door.

BRIEF EXPLANATION OF THE INVENTION

The present invention relates to a cabinet, in particular an electrical cabinet, having at least one door, comprising a framework made up of right angled metal profiles which are mutually connected by use of corner members having fastening elements inserted in cavities in the profiles, whereby each profile is symmetrical about a plane in 45° relatively to two of the main directions of the cabinet and comprises two grooves situated symmetrically about said plane, for sealing strips, said grooves being directed outwardly from the internal of the cabinet, whereby the sealing strips are in engagement with external wall panels, and whereby the bottom of each groove is situated inwardly of a respective profile wall which delimits the profile towards the internal of the cabinet, and the cabinet is characterized in that the grooves are situated along a respective free edge on the profile, whereby the profile is open from the external side, and that the bottom and/or the inner side wall of each groove forms an abutment for fastening of hinge parts at least in one of the profiles.

The sealing strips may be such constructed that they make electrical and physical contact between the profiles and wall panels and doors, or electrical contact may be established by a contact strip inserted in the sealing groove in parallel with the sealing strip. The contact strip may be made of metal, such as silver-plated beryllium copper.

Wall panels may be fastened in a suitable manner. Fastening elements inserted in holes in the wall panels may be used which have locking parts which by rotation are brought to mesh in a locking manner in the profiles. Thereby, making of bores for screws in the profiles is not necessary. Screws may of course also be used.

In all the corners of the cabinet the delimiting walls of the sealing grooves will meet two by two. A sealing strip can be inserted in the grooves and laid around the corner. The sealing strip may extend continuously in the same plane along all the sides of the cabinet and may be formed as an endless sealing strip. Without special provisions the sealing strips will be lying exposed to the outside in the corners, where the external groove walls do not meet. The sealing strips will only be in engagement on the internal side. Thus, the sealing strips will be visible on the external side, and they will not be protected against damage. Moreover, the sealing strips will not be supported along the external side at the corners, and they may be positioned such that a perfect sealing is not achieved. This problem is solved by the present invention, in that the corner members are provided or configured with quarter-cylindrical protrusions for each profile, i.e. that each corner member has three such protrusions, each covering a sector of 90° and extending parallelly to a main direction of the cabinet, whereby the protrusions are situated in such positions that they form connections between the external groove walls which meet two by two in the corners.

The profiles which delimit the cabinet at the top each have a gutter with a horizontal bottom and walls extending upwardly from the bottom. This gutter may, consequently, receive water when the cabinet is situated at a place where water is flushed. This water is situated on the outside of the sealing strips, and cannot enter the internal of the cabinet, but the water may be staying for a long time, until it possibly vaporizes. In order to achieve drainage of this water from the upper profiles recesses are formed in the protrusions, inwardly of the sectors which delimit the sealing grooves, i.e. closer to the root of each protrusion than these sectors. These recesses will cause communication between the horizontal gutters in which water may accumulate and the corresponding gutters in adjoining vertical profiles, whereby water will flow down. At the bottom of the cabinet the water will flow out of the gutters. Thus, water will not be staying in the upper profiles. The recesses may also be shaped like sectors, having a smaller inner radius than the sectors delimiting the sealing grooves in the corners. Thereby, the sealing grooves will also in the corners have bottoms which partially support the sealing strips, whereby these curved bottoms have a width which corresponds to the difference of inner radius between the sectors which delimit the gutters and the sectors which delimit the recesses for drainage. A presupposition for support of the strips is of course that the bottom is situated approximately in the same height as the bottoms of the straight grooves in the profiles.

The profile shape permits a particular fastening of door hinge parts anywhere along the length of the profiles. Hinge parts can be used which can be fixed in the profiles by means of at least one fixing screw in each hinge. The hinge parts may have such a configuration that a portion may engage the external side of the bottom of a sealing groove and the adjoining wall of the profile, and in such a manner that the fixing screw or screws is/are screwed against the transition between the external side of the bottom of the other sealing groove and the adjoining wall of the profile. In order to achieve stabilization of the hinge part it may also engage portions of the internal walls of the profile, which walls may be situated 90° relatively to each other and together with the flanges delimit a chamber having a square cross section. Hinge part is here intended to mean one part of a hinge which cooperates with another part fastened to a door. By means of such a fastening the hinge parts can be fastened anywhere along the length of any profile of the cabinet, and without any kind of working of the profiles, such as drilling of holes and insertion of screws or rivets.

The invention will in the following be explained more detailed, with reference to the accompanying drawings.

BRIEF EXPLANATION OF THE DRAWINGS

FIG. 4 shows a section of a profile and a hinge part mounted in the profile.

FIG. 5 diagrammatically shows fixing of a hinge part in a profile.

FIG. 7 shows a corner member and a profile mounted thereon, and a sealing strip being mounted in the profile.

DESCRIPTION OF EXAMPLES OF EMBODIMENTS

Figure 1:
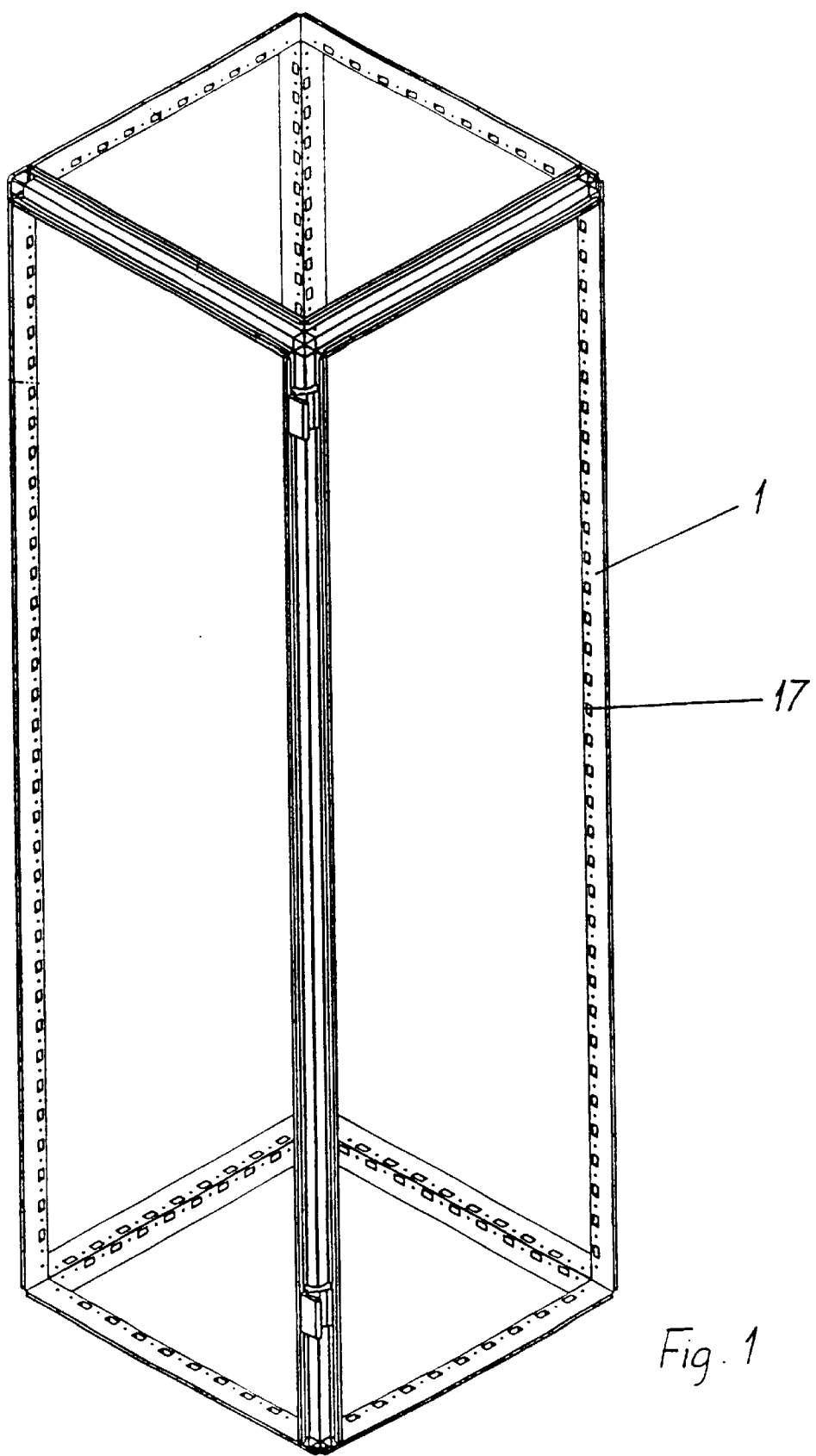
FIG. 1 shows a framework for a cabinet according to the invention, seen in perspective.

FIG. 1 shows a framework for a cabinet in accordance with the invention, with twelve profiles 1 connected together in corners by use of corner members, possibly also by welding. Holes 17 are formed in the profiles 1, for instance for mounting of equipment internally in the cabinet.

Figure 2:
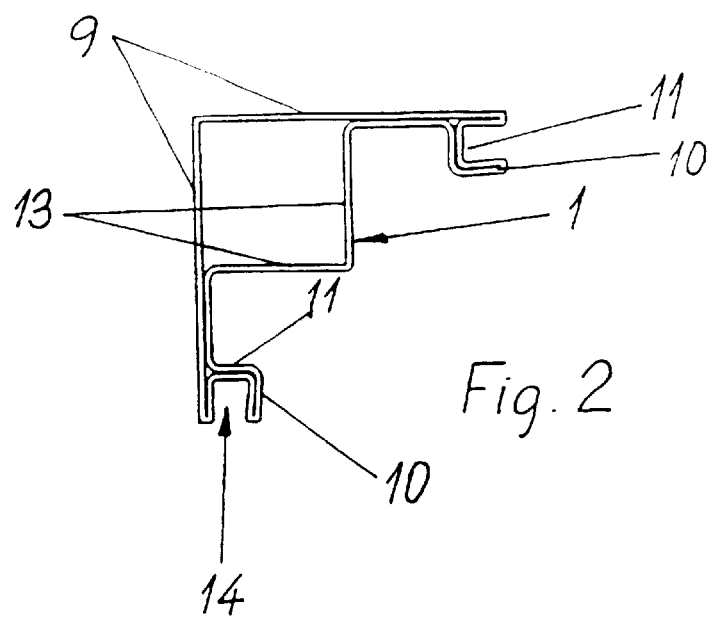
FIG. 2 shows an example of a profile in the framework.

FIG. 2 shows a possible cross sectional shape for a profile 1 used in the cabinet. The profile comprises two external walls 9, two internal walls 13 which together with portions of the external walls 9 delimit a chamber with an approximately square cross section, and grooves 14 for sealing strips, delimited by portions of the walls 9, and bottoms 11 and side walls 10. The shown profile is made by profiled rolling of a sheet from a blank being rolled to a closed profile and being welded together to form a tube, for instance of steel, but it will be understood that the profile can be formed by folding and by extrusion, for instance of light metal. By extrusion the walls will of course be compact.

Figure 3:
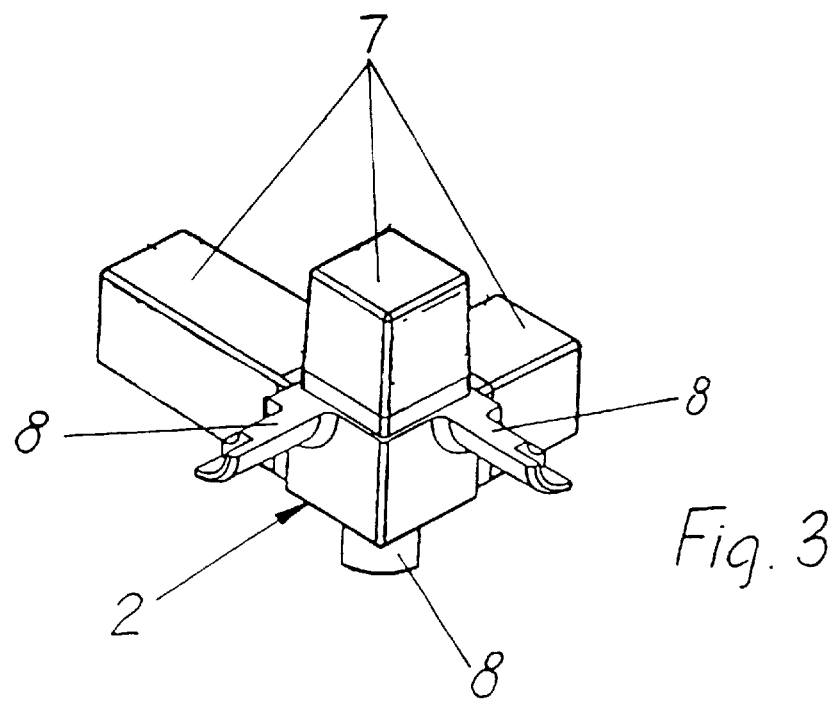
FIG. 3 shows a corner member situated in each corner of the cabinet.

FIG. 3 shows a corner member 2. The corner member 2 has three blocks 7, for insertion in a respective profile in a corner of the cabinet. The corner member 2 has three protrusions 8, extending parallelly with the main directions of the cabinet, i.e. with 90° between the protrusions 8 in different planes.

FIG. 4 shows a section of a profile 1, with a hinge part 3 mounted in the profile. FIG. 5 shows how the hinge part 3 is mounted, in that it has a nose 18 engaging the transition between a wall 9 and the bottom 11 of a sealing groove 14 (cf. FIG. 2 regarding these portions of the profile), and in that a screw 6 has been screwed into a threaded hole in the hinge part 3 and has been tightened against a corresponding transition between the other wall 9 and the bottom 11 of the other sealing groove 14. Moreover, the hinge part 3 may engage the square portion of the profile 1. In the shown embodiment the hinge part 3 may be a cut-off portion of an extruded profile, for instance of light metal. The hinge part 3 can be mounted exclusively by tightening of the screw 6, without any bore being formed in other parts than the hinge part 3.

Moreover, FIG. 5 shows sealing strips 12 and contact strips 20 mounted in the grooves 14, a portion of an external wall 4 and a door 5 hinged to the hinge part 3. The external wall 4 and the door 5 (in a closed position shown at the bottom of FIG. 5) engage the sealing strips 12 and possible contact strips 20. FIG. 5 also shows that the hinge part 3 may constitute an abutment for limiting the opening angle of the door 5.

Figure 6:
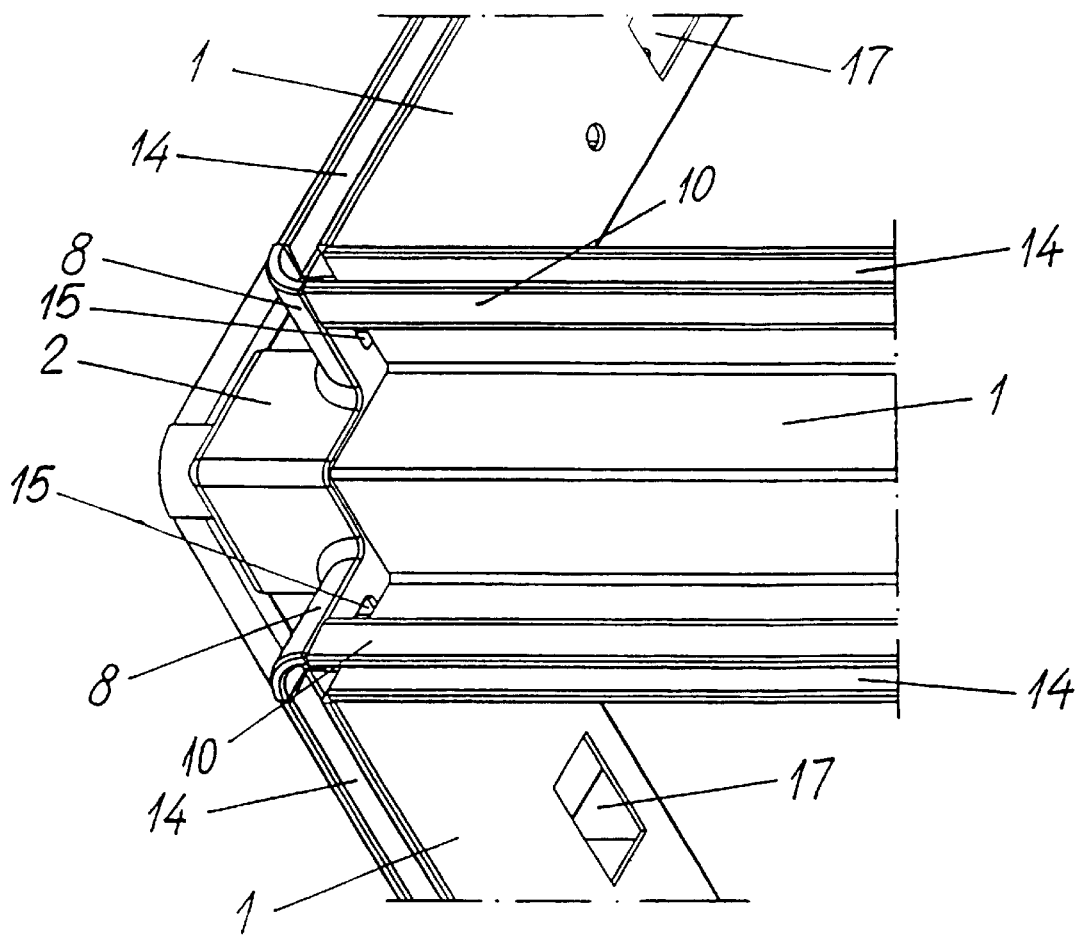
FIG. 6 shows in perspective a corner region of a cabinet.

FIG. 6 shows in perspective a corner region of the cabinet, without sealing strips. Three profiles 1 meet at a corner member 2. Each profile 1 has two grooves 14 for sealing strips. The internal walls, i.e. the flanges 9 (cf. FIG. 2) of the profiles 1 which delimit the grooves towards the internal of the cabinet, meet along straight edges. Here, the profiles may be welded together for the sake of sealing. To the contrary, the external groove walls 10 (cf. FIG. 2) delimiting the grooves 14 do not meet, but have a mutual spacing determined by the groove width. The corner member 2 is configured with protrusions 8 which partially fill the regions between the grooves 14. FIG. 6 shows recesses 15, which will be explained in connection with FIG. 7. It will appear from FIG. 6 that sealing strips mounted in the grooves such that they are lying around the edges formed by mutually adjoining groove sides formed by the walls will be surrounded by the protrusions 8.

FIG. 7 shows a corner region of the cabinet, seen from a location which will be internally of the cabinet, with only one profile 1 being mounted on a not visible block on a corner member 2. The Fig. shows how a sealing strip 12 lies on the inside of a protrusion 8 (to the right in the Fig.). At the bottom of FIG. 7 is shown how the protrusions 8 may be shaped, i.e. by comprising an outer sector 16 surrounding the sealing strip and an inwardly situated sector 15 forming the recess appearing from FIG. 6. There will be a step between the sectors 15 and 16, and if it is situated in the same height as the inner of the groove bottom 11, the step will form a support for the sealing strip in the corner.

It appears from FIG. 6 that if the gutter between a groove wall 10 and the inwardly situated wall 13 in the square of the profile is horizontal and is situated at the top of the cabinet, water will be able to flow down into the gutter, but the water will be drained through the recesses 15 at each end of the gutter and flow down through the vertical profiles 1.

Thus, a cabinet has been provided which only consists of one type of profiles in the corner edges and which permits mounting of sealing strips and contact strips in the profiles. The sealing strips can be protected at the corners of the cabinet and are also supported there, whereby they do not move out of position and cause deficient sealing. Additionally is achieved a simple fixation of hinge parts.

What is claimed is:

1. A cabinet having at least one door comprising:

a plurality of connecting frame members having a profile;

each of said profiles having a pair of right-angularly related and outwardly extending profile walls partially defining a central cavity thereof;

each of said profile walls defining a groove at a distal end thereof, each of said grooves facing interiorly of said profile walls and having an inner side wall positioned generally parallel to a respective one of said profile walls and a bottom wall generally parallel to a perpendicular one of said profile walls;

a plurality of corner members having three right-angularly related fastening elements each connecting to a profile of one of said frame members; and a plurality of sealing strips insertable into said grooves and in engagement with a plurality of external wall panels;

wherein each of said profiles has an external side that is open and bounded by said profile walls, said external side being arranged such that each of said grooves defines an abutment configured and dimensioned to fasten at least one hinge thereto.

2. The cabinet according to claim 1 wherein said corner members include a plurality of right-angularly related quarter-cylindrical protrusions extending outwardly therefrom, each of said quarter-cylindrical protrusions being configured and dimensioned to accommodate perpendicularly-related grooves of frame members connecting to said corner members.

3. The cabinet according to claim 2 wherein recesses are defined along said quarter-cylindrical protrusions and positioned near a base of each of said quarter-cylindrical protrusions, said recesses being in communication with gutters defined along said profiles of horizontally and vertically extending ones of said frame members to thereby permit drainage of water disposed therein.

4. The cabinet according to claim 1 wherein said hinge parts for at least one door are configured and dimensioned to engage an external side of said bottom of one of said grooves and an adjoining one of said profile walls, each of said hinge parts includes at least one threaded hole extending therethrough and is configured and dimensioned to accommodate at least one fixing screw adapted to fit in said threaded hole and extend therethrough so as to wedge an opposite one of said grooves and an adjoining one of said profile walls.

5. The cabinet according to claim 1 further comprising contact strips disposed in at least some of said grooves.

* * * * *